United States Patent [19]
Richardson et al.

[11] Patent Number: 6,028,764
[45] Date of Patent: Feb. 22, 2000

[54] PORTABLE COMPUTER WITH SEPARABLE SCREEN

[75] Inventors: John W. Richardson; Kelan C. Silvester, both of Portland; Marion H. Shimoda, Aloha, all of Oreg.; Gunjeet Baweja, Sunnyvale, Calif.

[73] Assignee: Intel Corporation, Santa Clara, Calif.

[21] Appl. No.: 09/265,650

[22] Filed: Mar. 10, 1999

Related U.S. Application Data

[63] Continuation of application No. 09/162,395, Sep. 28, 1998.

[51] Int. Cl.[7] .............................. G06F 1/16; G06F 3/147
[52] U.S. Cl. ......................... 361/681; 361/683; 248/917; 248/918
[58] Field of Search .................................. 361/681–686; 248/917–923; 345/905, 169, 168, 903; 364/708.1

[56] References Cited

U.S. PATENT DOCUMENTS

| | | | |
|---|---|---|---|
| 5,347,630 | 9/1994 | Ishizawa et al. | 361/681 |
| 5,745,340 | 4/1998 | Landau | 361/681 |
| 5,768,163 | 6/1998 | Smith, II | 364/708.1 |
| 5,781,407 | 7/1998 | Brauel | 361/681 |
| 5,796,576 | 8/1998 | Kim | 361/681 |
| 5,805,415 | 9/1998 | Tran et al. | 361/681 |

*Primary Examiner*—Leo P. Picard
*Assistant Examiner*—Lisa Lea-Edmonds
*Attorney, Agent, or Firm*—Trop, Pruner, Hu & Miles, P.C.

[57] ABSTRACT

A portable computer includes a display screen which is detachably connected to the remainder of the computer. When the screen is detached, communication may continue between the screen and the housing using one of a plurality of techniques, including infrared communications, radio frequency communications, or an extensible cable link. In this way, a display screen may be positioned at a more convenient location, for example for viewing by a plurality of viewers.

3 Claims, 4 Drawing Sheets

PORTABLE COMPUTER WITH SEPARABLE SCREEN

This application is a continuation of Ser. No. 09/162,395 filed Sep. 28, 1998.

BACKGROUND

This invention relates generally to portable computers, sometimes called laptop computers or notebook computers.

Portable computers have become increasingly popular because they can be used at one's normal workplace, using an AC adapter and a connection to normal line voltage, or they can be used away from one's normal workplace using a battery backup. For example, many users use a work station computer at one location and transfer data from the work station to the portable computer when they are traveling away from their regular workplace.

The display screens of portable computers are often smaller than those available with conventional computers. Thus, it is sometimes difficult to use a portable computer to display information to a number of viewers.

The use of the portable computer may be awkward for "on-the-road" presentations, because of the inability of numerous individuals to see the display screen. Of course, this difficulty can be by-passed using various projection systems, but these systems are themselves bulky and expensive.

Thus, there is a need for a portable computer which is more versatile in the ways in which it can display information.

SUMMARY

In accordance with one embodiment, a portable computer includes a housing having a processor. A display screen is detachably connectable to the housing. The screen includes an interface that permits the screen to communicate with the processor when the screen is detached from the housing.

DETAILED DESCRIPTION

Figure 1:
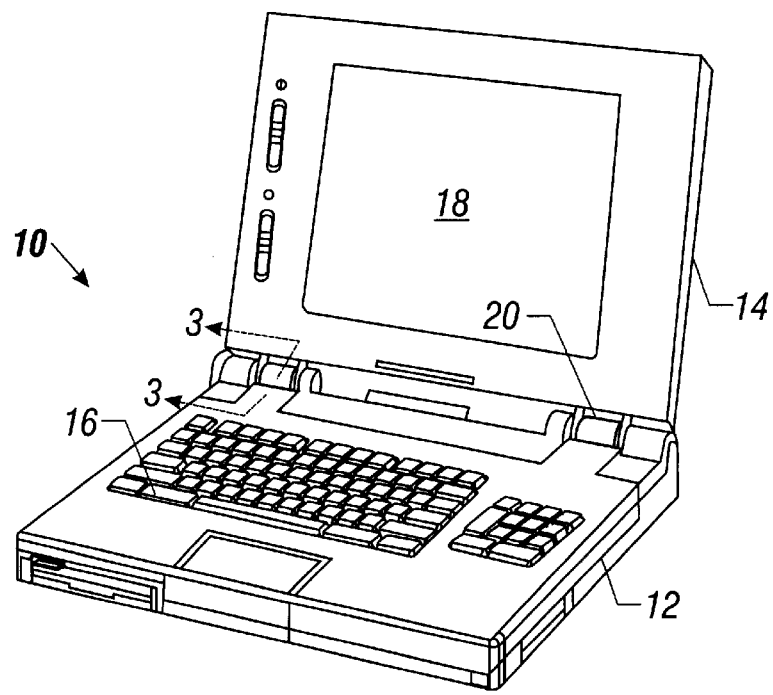
FIG. 1 is a perspective view of a portable computer in accordance with one embodiment of the present invention.

Referring to FIG. 1, a portable computer 10 includes a housing 12 with a keyboard 16 formed thereon. A display housing 14 is hingedly secured to the housing 12 using the hinges 20. When open, a display screen 18 is visible on the display housing 14.

Figure 2:
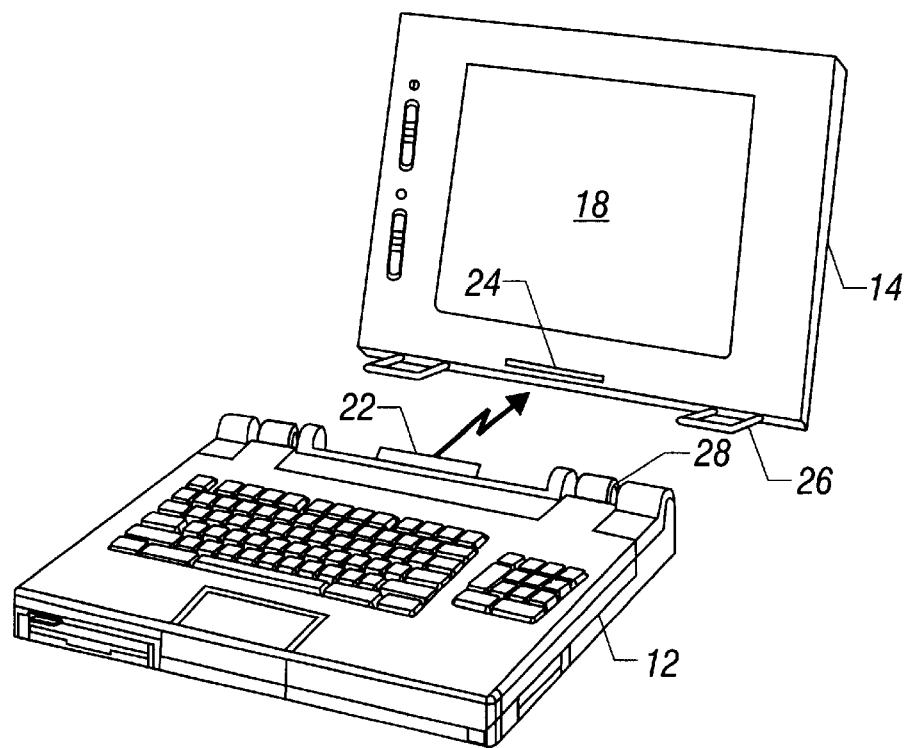
FIG. 2 is a perspective view of the computer shown in FIG. 1 after the display screen has been detached.

The display housing 14 is detachably secured to the housing 12 and a communication link is provided to allow the housings 12 and 14 to continue to communicate. That is, once the display housing 14 has been removed as shown in FIG. 2, it continues to communicate with the computer housing 12 (including the processor) as if they were still physically connected. This can be accomplished using any one of a variety of known techniques including an infrared communication link, a radio frequency communication link or a wire link which connects the display housing 14 back to the housing 12.

Greater flexibility can be achieved in displaying information to one or more users when the housing 14 has been detached from the housing 12. For example, in a conference with a number of persons attending, one person can enter information on the keyboard 16 while the display 18 may be put at a more convenient location for all to view. In addition, the display housing 14 may be hung on a wall or an easel for better visibility. It is also possible that one housing 12 could control more than one display 18 so that a number of displays 18 may be distributed for easier viewing.

In an embodiment using an infrared connector, as illustrated in FIG. 2, an infrared beam is produced by a transmitter 22 on the housing 12 and received by a receiver 24 on the display housing 14.

Figure 3:
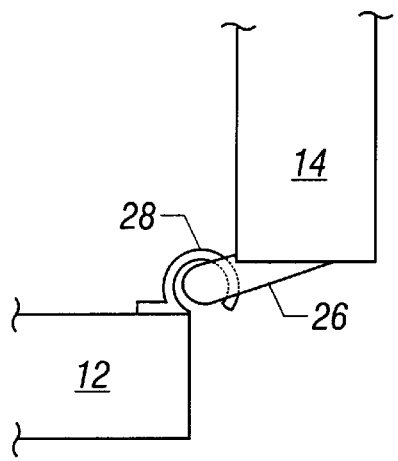
FIG. 3 is a partial, enlarged cross-sectional view taken generally along the line 3—3 in FIG. 1.

A variety of detachable connectors may be used to connect the housing 14 to the housing 12. One exemplary embodiment, shown in FIG. 3, uses a open ring 28 which journals a shaft 26. The shaft 26 may connect to the housing 14 while the open ring 28, on each side, is connected to the housing 12. The ring 28 may apply a frictional force to the shaft 26 to allow the housing 14 to be fixed at various desired angular orientations with respect to the housing 12.

Figure 4:
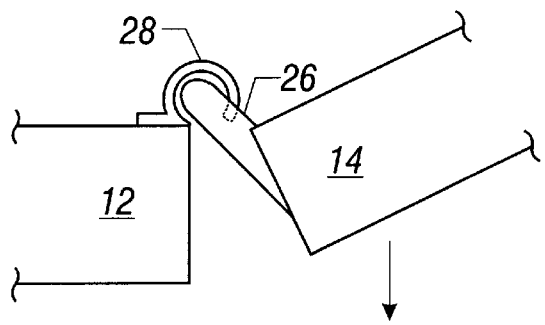
FIG. 4 is a partial, enlarged cross-sectional view showing the technique for removing the screen from the housing.

When it is desired to remove the housing 14, the housing is simply rotated to the parallel position shown in FIG. 4. In this position, if the housing 14 is pushed downwardly as indicated by the arrow, the shaft 26 springs out from the open ring 28 by biasing the ring outwardly.

In this way, the display housing 14 may be packed in a different container than the housing 12. In addition, communication can continue between the two housings. In some cases, a wire connection may be provided between the housings 12 and 14 when they are physically connected, as shown in FIG. 1. By using a conventional slip connection, this wire connection can be undone when the two housings are separated. Using a wire connection allows communication to be provided over a conventional cable as an alternative to what in some embodiments may be a less reliable or slower wireless transfer between the adapters 22 and 24.

Figure 5:
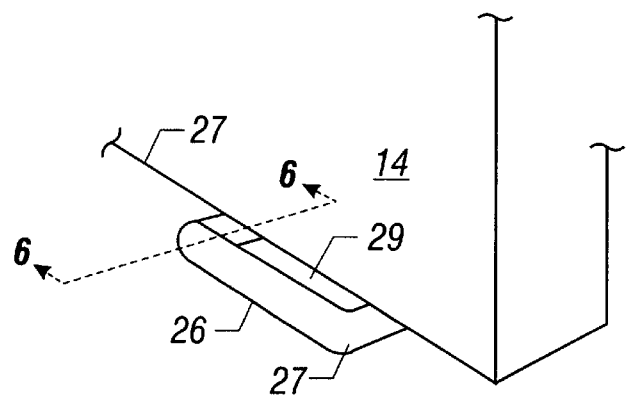
FIG. 5 is a partial, enlarged view of a connector for connecting the screen to the rest of the housing.
Figure 6:
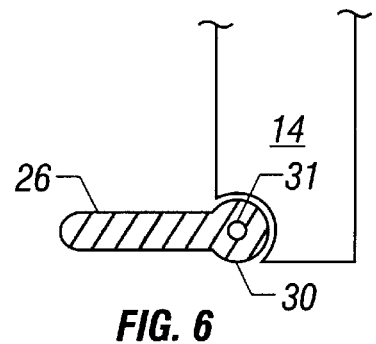
FIG. 6 is a partial, enlarged cross-sectional view taken generally along the line 6—6 in FIG. 5.

As shown in FIG. 5, the shafts 26 are connected by arms 27 to the housing 14. The rings 28 slip through the openings 29 between adjacent arms 27. As shown in FIG. 6, the shafts 26 are rotatably mounted on the display housing 14 using a tight pin 31 and ring 30 connection as illustrated in FIG. 6.

While one technique has been shown for removeably connecting the housings 12 and 14, those skilled in the art will appreciate numerous other connection techniques.

Figure 7:
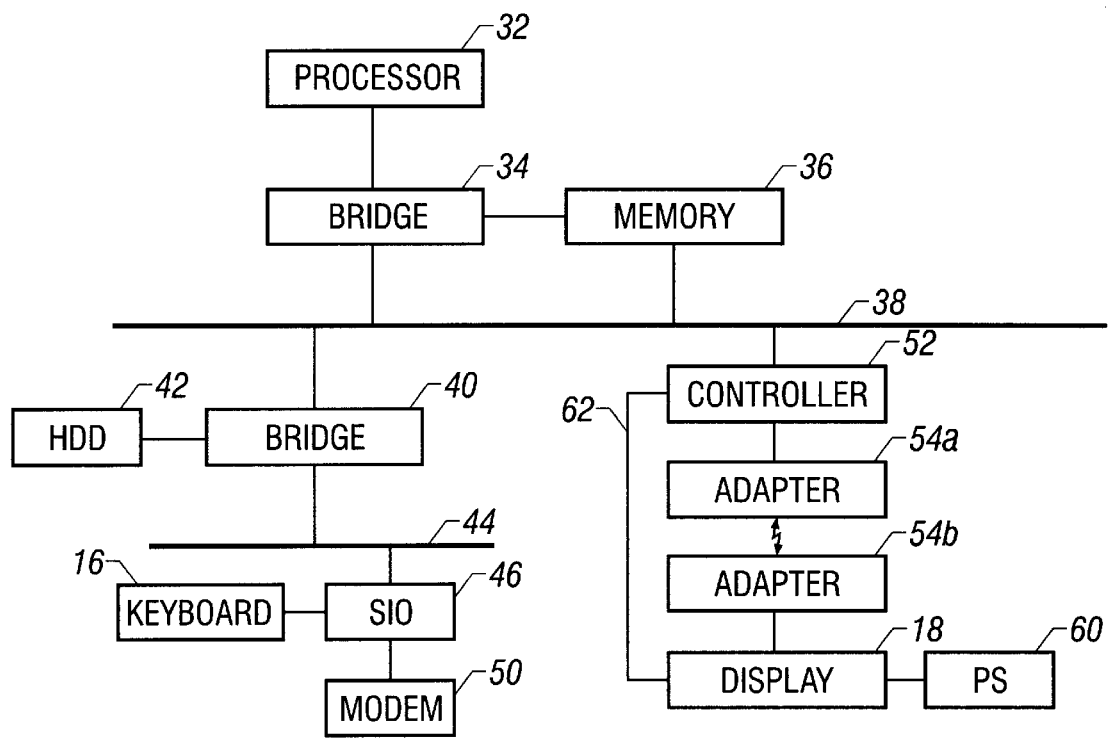
FIG. 7 is a block depiction of one exemplary embodiment of the present invention.
Figure 8:
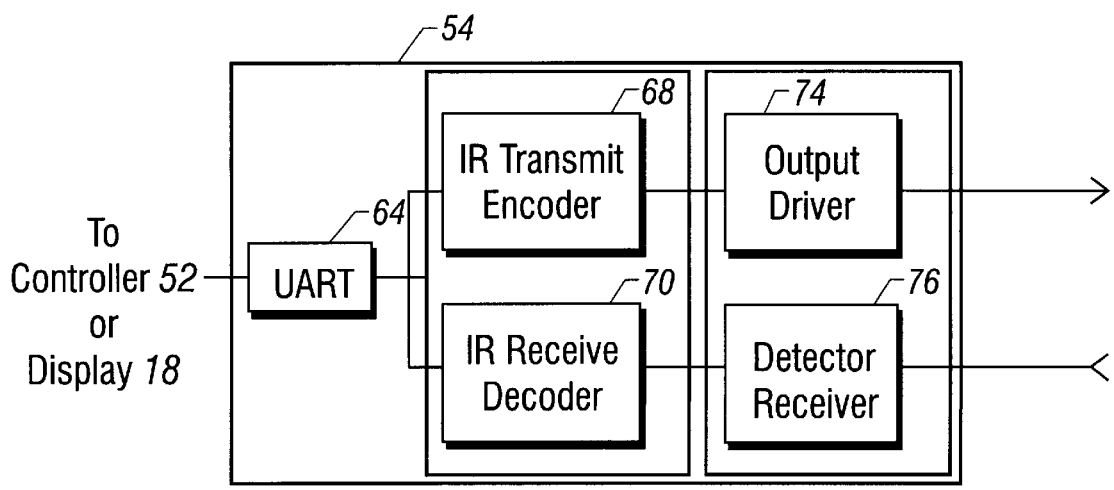
FIG. 8 is a block diagram showing one way to implement the adapters, shown in FIG. 7, in an infrared communication link.

Referring to FIG. 7, the computer 10 includes a processor 32 contained in the housing 12. Also contained in the housing 12 is a bridge 34 and a system memory 36. Similarly, a bus 38 may couple to a display controller 52 and a bridge 40 which are also contained within the housing 12. The bridge 40 may in turn be coupled to a hard disk drive 42 provided in the housing 12. The bridge 40 may also connect to another bus 44 which may be coupled to a serial input/output device (SIO) 46 which may receive inputs from the keyboard 16 and a modem 50'.

The display controller 52 may be connected to a display 18 by a serial cable 62. The cable 62 may releasably connect to the display 18 so that when the housing 14 is detached from the housing 12, the electrical connection afforded by the cable 62 is released. The controller 52 and display 18 may also communicate through a pair of adapters 54a and 54b. The adapters 54a and 54b may be either be infrared red (IR) adapters or radio frequency (RF) adapters which allow communication over the intervening air space. If the adapters 54 are IR adapters, they conveniently may be implemented in accordance with the Infrared Data Association (IrDA) standards and specifications (such as the Serial Infrared Link Access protocol Version 1.0, Jun. 23, 1994 which may be found at {www.irda.org}).

The display housing 14 may include its own power supply 60. Conveniently, the power supply 60 is a battery power supply but the power supply also may include an AC adapter which allows an AC power source to be used to power the display 18. The power supply 60 may conventionally be a separate power supply from that used to control the remainder of the computer 10. However it is also possible for a single AC adapter to be utilized with either or both of the housings 12 and 14. In one embodiment, the display 14 may include a capacitive storage element which stores charge drawn from the battery contained within the housing 12 to enable short term operation of the display while separated from the housing 12.

In another embodiment using an infrared communication system for the adapters 54a and 54b, the controller 52 may be connected to an universal asynchronous receiver/transmitter 64 (UART). The UART 64 communicates with an IR transmit encoder 68 and an IR receive decoder 70. The encoder 68 communicates with an output driver 74 which drives an IR signal through the port 22 or 24. Similarly the detector and receiver 76 communicates with the receive decoder 70 to receive an incoming IR signal through a port 22 or 24. In accordance with the current IrDA specifications, higher data transfer rates may be used by using a communication controller in place of a UART 64.

Thus, two-way communications between the display 18 and controller 52 may be possible. For example, a light sensor on the display may send information back to the controller to enable intensity adjustments. In addition, with a touch screen display, user screen inputs may be sent to the controller.

Figure 9:
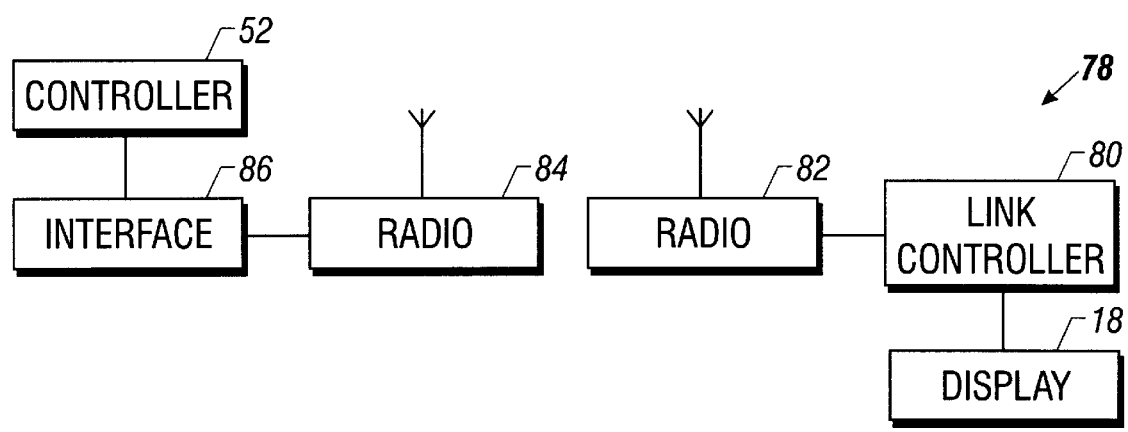
FIG. 9 is a block diagram showing another way to implement the adapters, shown in FIG. 7, in a radio link.

Referring now to FIG. 9, a radio link 78 may connect the adapters 54, for example, when the housing 14 is detached from the housing 12. The radio link continues to transmit data from the housing 14 back to the housing 12 through the radio link 78. The display 18 may be connected to a radio 82 by a link controller 80. The radio 82 transmits a radio frequency signal to a radio 84 connected to the controller 52 by an interface 86.

A variety of conventional radio links may be utilized. One particularly advantageous radio link is the Bluetooth radio link (see www.bluetooth.com) which is a short-range, cable replacement, radio technology. It uses the 2.4 GHz Instrumentation, Science, Medical (ISM) unlicensed band. The radios 82, 84 may be set to a nominal range of 10 meters augmentable with an external power amplifier to up to 100 meters. Seventy-nine hop frequencies are utilized beginning at the lowest frequency which is 2402 MHz and each of the 79 hop frequencies is 1 MHz above the next lower frequency.

A connection may be made between the two radios 82, 84 by sending a page message. A page message may include a train of 16 identical page messages on 16 different hop frequencies. The system may use a Synchronous Connection Oriented (SCO) link for point-to-point, full duplex links, normally used in voice communication. For the application described herein, the Asynchronous Connectionless Link (ACL) may be used.

ACL provides one frame duration links with full duplex communications. ACL communications use a time division duplex scheme. A first slot provides a transmission from the master to the slave and a second slot provides a transmission from the slave to the master. Each slot is transmitted on a different hop frequency. The device initializing the transmission is designated the master and the device receiving the transmission is designated the slave.

The link controller 80 includes the hardware for performing the baseband processing and the basic protocols close to the physical layer such as the error correction coding and the automatic repeat request (ARQ). ARQ provides an acknowledgement to the master, in response to a transmission in one slot, in the next following slot which comes from the slave and vice versa. The Bluetooth system uses GFSK modulation and a BT-product of 0.5. The data and symbol rate is 1 Ms/s at the air interface.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A portable computer comprising:

a housing, said housing having a processor;

a display screen connected to said housing by a hinge;

a detachable connector for physically connecting said display screen to said housing so that said display screen can be detached from said housing by the user;

a wireless communication adapter on said screen and said housing to enable wireless communications between said screen and said housing; and a releasable cable connection between said display screen and said housing, said cable connection being automatically releasable when said screen is detached.

2. The computer of claim 1 wherein said display screen and said housing are adapted to communicate using infrared signals.

3. The computer of claim 1 wherein said housing and said display screen communicate using radio frequency signals.

* * * * *